United States Patent
van de Veerdonk et al.

(10) Patent No.: US 7,128,987 B2
(45) Date of Patent: Oct. 31, 2006

(54) MULTILAYER MAGNETIC RECORDING MEDIA INCLUDING COMPOSITE LAYER WITH DISCONTINUOUS MAGNETIC PHASE AND CONTINUOUS NON-MAGNETIC PHASE

(75) Inventors: Rene Johannes Marinus van de Veerdonk, Pittsburgh, PA (US); Duane Clifford Karns, Warrendale, PA (US); Dieter Klaus Weller, Gibsonia, PA (US); Yukiko Kubota, Pittsburgh, PA (US)

(73) Assignee: Seagate Technology LLC, Scotts Valley, CA (US)

( * ) Notice: Subject to any disclaimer, the term of this patent is extended or adjusted under 35 U.S.C. 154(b) by 26 days.

(21) Appl. No.: 10/337,103

(22) Filed: Jan. 6, 2003

(65) Prior Publication Data
US 2003/0235717 A1    Dec. 25, 2003

Related U.S. Application Data

(60) Provisional application No. 60/390,741, filed on Jun. 21, 2002.

(51) Int. Cl.
  G11B 5/66   (2006.01)
  G11B 5/70   (2006.01)
(52) U.S. Cl. .............. 428/828; 427/130; 427/131; 204/192.2
(58) Field of Classification Search ........ 428/694 TM, 428/694 TS, 336, 900, 828, 828.1, 829; 427/130, 427/131; 204/192.2
See application file for complete search history.

(56) References Cited

U.S. PATENT DOCUMENTS 4,379,183 A    4/1983    Araki et al.

(Continued)

FOREIGN PATENT DOCUMENTS

DE    19651579    6/1997

(Continued)

OTHER PUBLICATIONS

E. A. M. Van Alphen et al, "Granular Co/Ag Multilayers: Relation Between Nanostructure, And Magnetic And Transport Properties", *Physical Review B*, vol. 51, No. 13, Apr. 1, 1995, pp. 8182-8192.

(Continued)

*Primary Examiner*—Holly Rickman
(74) *Attorney, Agent, or Firm*—Alan G. Towner, Esq.; Pietragallo, Bosick & Gordon LLP

(57) ABSTRACT

Multilayer magnetic structures comprising composite layers and spacer layers are disclosed. The composite layers include a discontinuous magnetic phase such as Co, Ni or Fe platelets, and a continuous nonmagnetic phase such as C, $AlO_x$, $SiO_x$, $ZrO_x$, Cu, Ag and Au. The spacer layers may comprise Pt, Pd, Au or the like. The composite layers and spacer layers may be made by sputtering. The multilayer structures are useful as magnetic recording layers of magnetic recording media. In one embodiment, the recording media comprises a perpendicular magnetic recording medium including a substrate, a soft magnetic underlayer, a seed layer and the multilayer structure.

26 Claims, 2 Drawing Sheets

U.S. PATENT DOCUMENTS

| | | |
|---|---|---|
| 4,404,238 A | 9/1983 | Baldwin |
| 4,606,971 A | 8/1986 | Ido et al. |
| 4,636,433 A | 1/1987 | Kubo et al. |
| 4,978,584 A | 12/1990 | Reim et al. |
| 5,217,820 A | 6/1993 | Isshiki et al. |
| 5,503,911 A | 4/1996 | Aoki et al. |
| 5,503,922 A | 4/1996 | Shimasaki et al. |
| 5,750,270 A | 5/1998 | Tang et al. |
| 5,820,769 A | 10/1998 | Chou |
| 5,834,085 A | 11/1998 | Lairson et al. |
| 5,965,194 A | 10/1999 | Truong et al. |
| 6,007,623 A | 12/1999 | Thiele et al. |
| 6,055,139 A | 4/2000 | Ohtsuka et al. |
| 6,086,974 A | 7/2000 | Thiele et al. |
| 6,136,061 A | 10/2000 | Gibson |
| 6,136,428 A | 10/2000 | Truong et al. |
| 6,324,032 B1 | 11/2001 | Ohtsuka et al. |
| 6,383,597 B1 | 5/2002 | Fullerton et al. |
| 6,383,598 B1 | 5/2002 | Fullerton et al. |
| 6,391,430 B1 | 5/2002 | Fullerton et al. |
| 6,440,589 B1 | 8/2002 | Fullerton et al. |
| 6,500,497 B1 | 12/2002 | Wang et al. |
| 6,656,613 B1 * | 12/2003 | Litvinov et al. ..... 428/694 TM |
| 2001/0016271 A1 | 8/2001 | Aoyama |
| 2002/0037439 A1 | 3/2002 | Litvinov et al. |
| 2003/0082410 A1 * | 5/2003 | Sato et al. ............ 428/694 EC |
| 2004/0151949 A1 * | 8/2004 | Oikawa et al. ...... 428/694 TM |

FOREIGN PATENT DOCUMENTS

| | | |
|---|---|---|
| DE | 10026050 | 12/2000 |
| EP | 0797192 | 9/1997 |
| EP | 0808497 B1 | 11/1997 |
| GB | 2302980 | 2/1997 |
| WO | WO 01/99100 | 12/2001 |

OTHER PUBLICATIONS

J. S. Yin et al, "Ordered Self-Assembling Of Tetrahedral Oxide Nanocrystals", *Physical Review Letters*, vol. 79, No. 13, Sep. 29, 1997, pp. 2570-2573.

H. Brune et al, "Self-Organized Growth Of Nanostructure Arrays On Strain-Relief Patterns", *Letters To Nature*, vol. 394, Jul. 30, 1998, pp. 451-453.

O. Fruchart et al, "Self-Organized Growth Of Nanosized Vertical Magnetic Co Pillars On Au(111)", *Physical Review Letters*, vol. 83, No. 14, Oct. 4, 1999, pp. 2769-2772.

S. P. Li et al, "Magnetic Nanoscale Dots On Colloid Crystal Surfaces", *Applied Physical Letters*, vol. 76, No. 6, Feb. 7, 2000, pp. 748-750.

S. L. Silva et al, "Fabricating Nanometer-Scale Co Dot And Line Arrays On Cu(100) Surfaces", *Applied Physical Letters*, vol. 76, No. 9, Feb. 28, 2000, pp. 1128-1130.

S. Sun et al, "Monodisperse FePt Nanoparticles And Ferromagnetic FePt Nanocrystal Superlattices", *Science*, vol. 287, Mar. 17, 2000, pp. 1989-1992.

D. Babonneau et al, "Evidence For A Self-Organized Growth In Granular Co/$Al_2O_3$ Multilayers", *Applied Physical Letters*, vol. 76, No. 20, May 15, 2000, pp. 2892-2894.

* cited by examiner

MULTILAYER MAGNETIC RECORDING MEDIA INCLUDING COMPOSITE LAYER WITH DISCONTINUOUS MAGNETIC PHASE AND CONTINUOUS NON-MAGNETIC PHASE

CROSS REFERENCE TO RELATED APPLICATION

This application claims the benefit of U.S. Provisional Patent Application Ser. No. 60/390,741 filed Jun. 21, 2002.

FIELD OF THE INVENTION

The present invention relates to magnetic recording media, and more particularly relates to multilayer magnetic recording structures including at least one composite layer having discontinuous magnetic regions or platelets surrounded by continuous nonmagnetic regions.

BACKGROUND INFORMATION

Media noise suppression and thermal stability remain key challenges to extending magnetic recording technology beyond the currently achieved areal densities. Future density advancements may require magnetically harder materials and, as a consequence, larger write fields. It is also known that in order to exploit the potential of magnetically harder materials a finer grain structure with properly decoupled grains and tight control of magnetic and physical grain size distributions are required.

Perpendicular magnetic recording employing magnetic media comprising a hard magnetic recording layer and a soft magnetic underlayer is evolving as a follow-on technology to current longitudinal magnetic recording systems. There are currently very few media and materials technology options in light of the stringent boundary conditions imposed by thermal stability and signal-to-noise requirements which must be met in order to extend perpendicular magnetic recording to areal densities beyond 80 or 100 $Gbit/in^2$. Although significantly higher areal densities are theoretically achievable in perpendicular magnetic recording systems, such densities may only be achieved if the grain-count per bit is drastically reduced, e.g., from currently about 80 grain-count per bit (based upon an areal density of 100 $Gbit/in^2$; 35 nm×180 nm bit cell; 750 kfci× 150 ktpi; and 10–15% channel overhead) to as low as 10 grain-count per bit (based upon an areal density of 500 $Gbit/in^2$; 11 nm×47 nm bit cell; 1850 kfic×540 ktpi; and greater than 35% channel overhead). However, such increased areal densities will lead to higher relative media noise and will require significantly improved channel detectors, with associated large error-correction overhead.

In order to achieve significantly improved areal densities with perpendicular magnetic recording media, the magnetic cluster size needs to be reduced, e.g., to about 8 nm, and the grain size distribution should be trimmed, e.g., below about 10 percent (sigma over mean). Current state-of-the-art sputtered media have grain size distributions of about 25 percent. It remains a major challenge to achieve the grain distribution target using current thin film sputtering processes and materials.

A need therefore exists for perpendicular magnetic recording media having enhanced signal-to-noise ratios and sufficiently high thermal stabilities.

SUMMARY OF THE INVENTION

An aspect of the present invention is to provide a magnetic recording medium comprising a substrate and a multilayer magnetic recording structure on the substrate comprising alternating layers of composite material and spacer material, wherein the composite material comprises a discontinuous magnetic phase and a continuous nonmagnetic phase.

Another aspect of the present invention is to provide a multilayer magnetic recording structure comprising alternating layers of composite material and spacer material, wherein the composite material comprises a discontinuous magnetic phase and a continuous nonmagnetic phase.

A further aspect of the present invention is to provide a method of making a multilayer magnetic recording structure. The method includes depositing alternating layers of composite material and spacer material, wherein the composite material comprises a discontinuous magnetic phase and a continuous nonmagnetic phase.

These and other aspects of the present invention will be more apparent from the following description.

DETAILED DESCRIPTION

Figure 1:
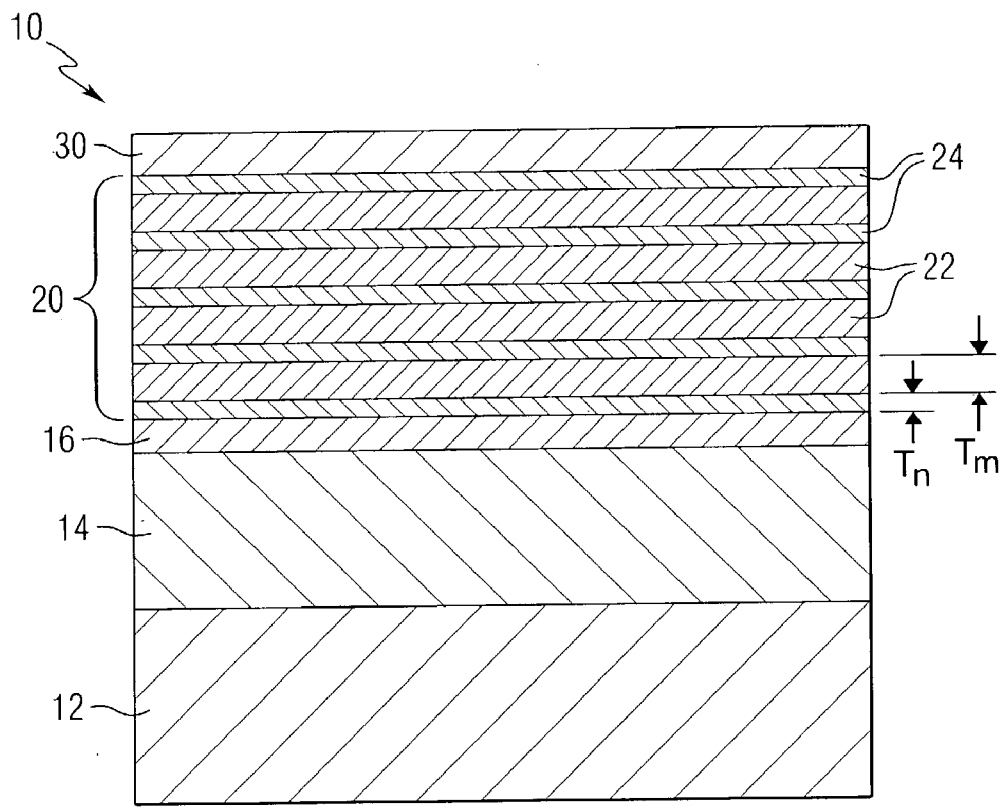
FIG. 1 is a partially schematic sectional side view of a perpendicular magnetic recording medium including a multilayer magnetic recording structure with composite layers in accordance with an embodiment of the present invention.

FIG. 1 is a partially schematic sectional side view of a perpendicular magnetic recording medium 10 in accordance with an embodiment of the present invention. The perpendicular magnetic recording medium 10 includes a substrate 12, a soft magnetic underlayer 14 and a seed layer 16. The substrate 12 may be made of any suitable material such as ceramic glass, amorphous glass, aluminum or NiP coated AlMg. The soft underlayer 14 has a typical thickness of from about 50 to about 200 nm, and may be made of any suitable material such as CoFe, FeCoB, FeAlN, FeAlSi, NiFe, CoZrNb or FeTaN. The soft underlayer 14 may also comprise laminated structures such as (FeCoB/Ta)·n where n is from 2 to 5, or (FeAlSi/C)·n where n is from 2 to 20. The soft underlayer 14 may further comprise exchange biased structures such as Cu/(IrMn/FeCo)·n where n is from 1 to 5. The seed layer 16 has a typical thickness of from about 1 to about 50 nm and may be made of a material such as CoCr, CoCrRu, Ru, Pt, Pd, Rh, Ta, TiC, indium tin oxide (ITO), AlN or ZnO.

As shown in FIG. 1, the perpendicular magnetic recording medium 10 also includes a multilayer magnetic recording structure 20 including multiple magnetic layers 22 separated by nonmagnetic or spacer layers 24. As described in more detail below, each magnetic layer 22 comprises a composite material with a discontinuous magnetic phase and a continuous nonmagnetic phase. The perpendicular magnetic recording medium 10 also includes an overcoat 30 deposited on the multilayer structure 22. The protective overcoat 32 may be made of any suitable material such as diamond-like carbon.

Although the multilayer structure 20 shown in FIG. 1 comprises four composite layers 22 and five spacer layers 24, any suitable number of layers may be used. For example, the multilayer recording structure 20 may include from 1 to 40 layers or more of each of the composite material and spacer material.

Figure 2:
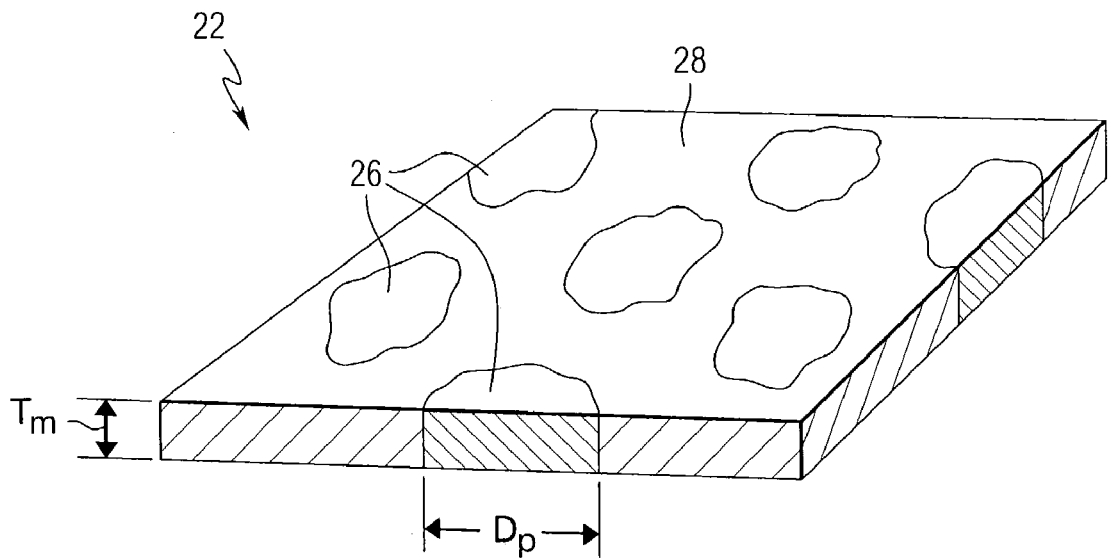
FIG. 2 is a partially schematic sectional isometric view of a composite layer comprising a discontinuous platelet-shaped magnetic phase and a continuous nonmagnetic phase.

One of the composite layers 22 of the multilayer magnetic recording structure 20 is shown in FIG. 2. The composite layer 22 includes a discontinuous magnetic phase in the form of platelets 26 and a continuous nonmagnetic phase 28. In the embodiment shown in FIG. 2, the magnetic phase 26 is provided in the form of substantially equiaxed platelets. The platelets 26 typically have average diameters $D_p$ of from about 5 to about 40 nm, for example, from about 10 to about 20 nm. The magnetic platelets 26 typically comprise from about 30 to about 80 volume percent of the composite layer 22, for example, from about 45 to about 65 volume percent.

The composite layer 22 has a thickness $T_m$ typically of from about 0.2 to about 0.8 nm, for example, from about 0.3 to about 0.5 nm. As shown most clearly in FIG. 1, each nonmagnetic spacer layer 24 has a thickness $T_n$ typically of from about 0.6 to about 3 nm, for example, from about 0.8 to about 1.5 nm. The thickness of each composite layer $T_m$ may be the same throughout the multilayer structure 20, and the thickness of each nonmagnetic spacer layer $T_n$ may be the same throughout the multilayer structure 20. Alternatively, the thicknesses $T_m$ of the composite layers 22 may vary, and the thicknesses $T_n$ of the nonmagnetic spacer layers 24 may vary, throughout the multilayer structure 20.

The discontinuous magnetic phase of the composite layer 22, such as the magnetic platelets 26 shown in FIG. 2, may comprise a metal such as Co, Ni, Fe, FeCo, FeNi, FePt, CoNi or CoPt. Cobalt may be used due to its large intrinsic magnetic hardness (anisotropy) properties.

The continuous nonmagnetic phase 28 of the composite layer 22 may comprise any suitable material in which the discontinuous phase 26 is immiscible or otherwise results in the formation of the discontinuous phase 26. For example, the continuous nonmagnetic phase 28 may comprise C, $SiO_x$, $ZrO_x$, $TiO_x$, $AlO_x$, SiN, ZrC, WC, TaC, TiC, Cu, Ag or Au.

The nonmagnetic spacer layers 24 may comprise any suitable material, such as Pt, Pd, Au and combinations thereof. The nonmagnetic spacer layers 24 are typically formed by deposition processes such as sputtering, evaporation or ion beam deposition. The use of Pt or other noble metals also provides good corrosion resistance, allowing for thin overcoats to be used.

Each composite layer 22 may be formed by processes such as sputtering, evaporation, molecular beam epitaxy or ion beam deposition. For example, the composite layer 22 may be formed by sputtering techniques using separate targets for each of the magnetic 26 and nonmagnetic 28 phases. Alternatively, the composite layer 22 may be deposited by sputtering techniques using a single target comprising both the magnetic 26 and nonmagnetic 28 materials. The magnetic 26 and nonmagnetic 28 phases may be sputtered simultaneously or sequentially. For example, the nonmagnetic material 28 may initially be sputtered, followed by the magnetic material 26 and, optionally, followed by additional sputtering of the nonmagnetic material 28. The magnetic platelets 26 may be formed directly upon sputtering, or may be formed by subsequent processing such as heat treatment or surface treatment of the layer 22.

Deposition may be carried out, for instance, at room temperature or at elevated temperatures of, e.g., from about 50 to about 400° C. For example, the alternating layers may be deposited by sputtering the desired number of atomic layer(s) of each material onto a rotating substrate. Commercially available dc or rf magnetron sputtering systems utilizing sputtering targets in a variety of shapes and sizes and Ar, Kr and/or Xe inert sputtering gas may be suitable for fabricating the multilayer structure 20.

After the multilayers have been deposited, the multilayer structure may optionally be annealed. Typical annealing operations may be carried out at temperatures of from about 150 to about 350° C. or higher, for times of from about 1 minute to about 2 hours, depending on the type of material.

Figure 3:
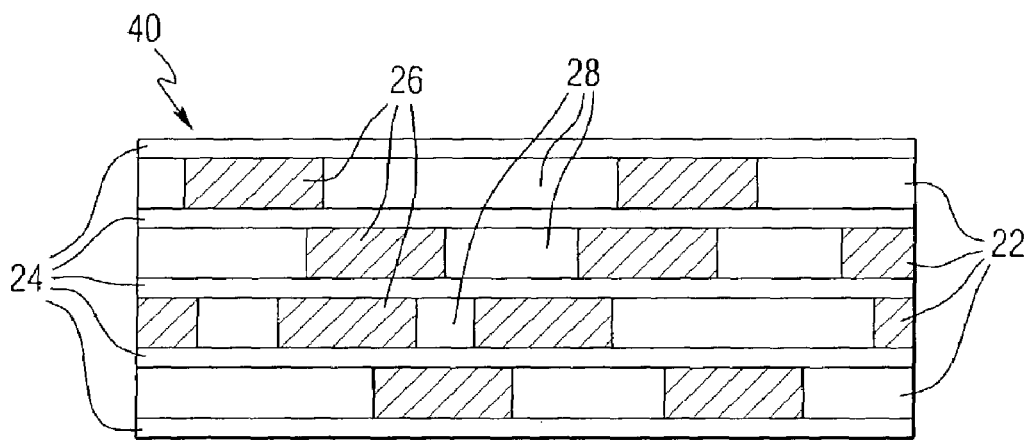
FIG. 3 is a partially schematic sectional side view of a multilayer magnetic recording structure including multiple composite layers with randomly positioned magnetic platelets throughout the layers in accordance with an embodiment of the present invention.

FIG. 3 is a partially schematic sectional side view of a multilayer magnetic recording structure 40 including multiple composite layers 22 and spacer layers 24. The composite layers 22 have randomly positioned magnetic platelets 26 surrounded by a continuous magnetic phase 28 throughout the layers in accordance with an embodiment of the present invention.

Figure 4:
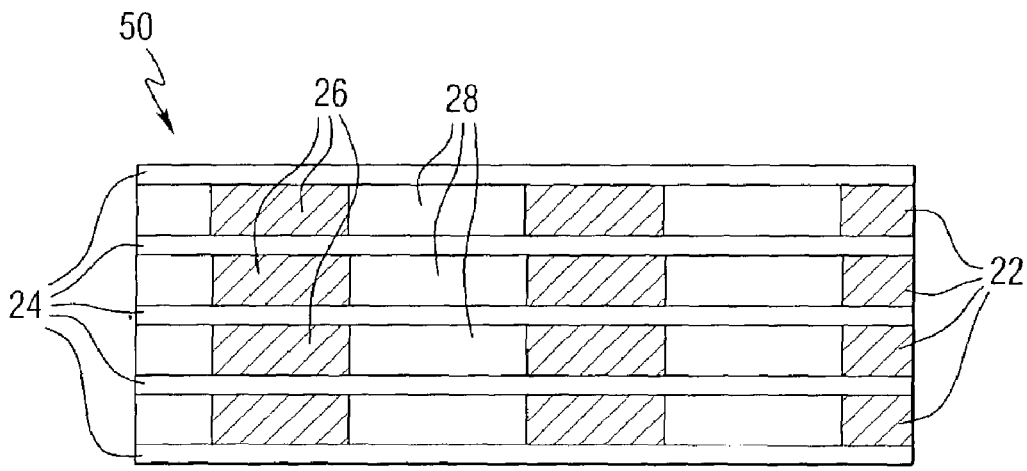
FIG. 4 is a partially schematic sectional side view of a multilayer magnetic recording structure including multiple composite layers with vertically aligned magnetic platelets throughout the layers in accordance with an embodiment of the present invention.

FIG. 4 is a partially schematic sectional side view of a multilayer magnetic recording structure 50 including multiple composite layers 22 and spacer layers 24. The composite layers 22 have vertically aligned magnetic platelets 26 surrounded by a continuous magnetic phase 28 throughout the layers in accordance with an embodiment of the present invention.

Figure 5:
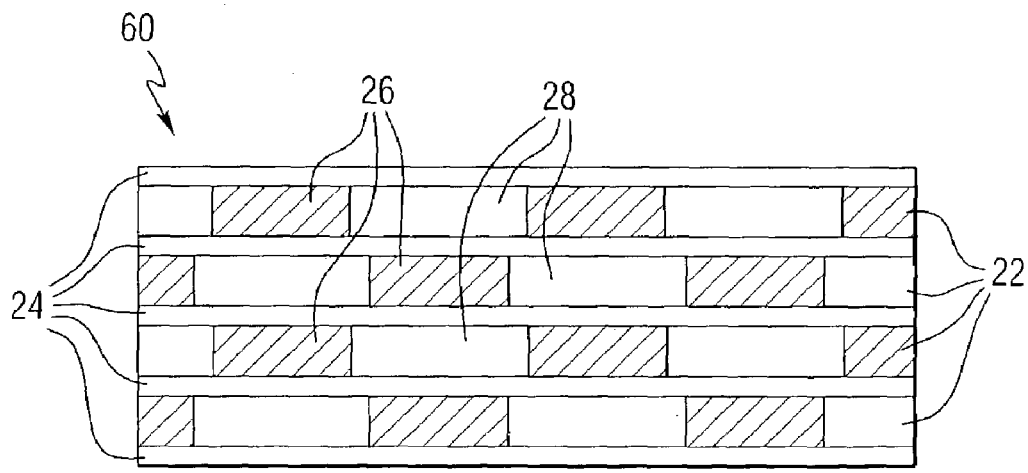
FIG. 5 is a partially schematic sectional side view of a multilayer magnetic recording structure including multiple composite layers with non-vertically aligned magnetic platelets throughout the layers in accordance with an embodiment of the present invention.

FIG. 5 is a partially schematic sectional side view of a multilayer magnetic recording structure 60 including multiple composite layers 22 and spacer layers 24. The composite layers 22 have non-vertically aligned magnetic platelets 26 surrounded by a continuous magnetic phase 28 throughout the layers in accordance with an embodiment of the present invention.

In accordance with the present invention, platelet media may be produced as very thin independent switching units in systems with large perpendicular magnetic anisotropy. For example, Co/Pt multilayers may be used. Starting from an interfacial anisotropy term $K_S$ approximately equal to 1 erg/cm$^2$ one arrives at extremely large volume anisotropies $K_u$ approximately equal to $K_S/t_{Co} = 5 \times 10^7$ erg/cm$^3$ per single Co/Pt interface, assuming a mono-atomic layer of Co ($t_{Co} = 0.2$ nm) and neglecting a small volume term. Such large anisotropies may enable very thin stable platelets of thickness as small as about 2 nm. For example, one such platelet could consist of 0.2 nm thick Co surrounded by 0.9 nm thick Pt on either side. Assuming a total media thickness of 14 nm, P=7 such platelet layers could be located in the thickness of the medium. The SNR of such a system is: SNR=10×(log(P)+log(N)); where N=number of platelets in cross track direction. The SNR gain would be ΔSNR'2 SNR(P=7)−SNR(P=1)=10×(log(7))=8.5 dB.

In an embodiment of the present invention, immiscible Co-X materials, such as CoAg or CoCu, may be used to form the magnetic platelet material (Co) in the continuous nonmagnetic material (Ag, Cu). In addition to Co/Ag, other examples exist where self-organized growth into the desired platelet structure may be achieved. Another example is Co platelets embedded in an $Al_2O_3$ matrix. Alternatively, superlattices of chemically synthesized nano-particle structures, such as FePt particles with small diameter, may also be produced. Examples of immiscible systems for the composite layer 22 include Co:C, Co:SiO$_x$, Co:Cu, Co:Au, Co:Ag, FeZrO$_x$, Fe:Cr and Ni:C. Two-dimensional segregation via growth at controlled temperatures may produce two-dimensional cobalt islands surrounded in the plane with X (such as Ag, Cu, etc.).

Perpendicular anisotropy is then obtained by surrounding the discontinuous cobalt platelets with Pt or other suitable spacer layers of controlled thickness. Although a Co/Pt platelet/spacer layer combination may be particularly suitable for many applications, other multilayer systems may also exhibit perpendicular magnetic anisotropy, e.g., Co/Pd, Co/Cr, Co/Au, Fe/Pt, Ni/Pt and Fe/Tb.

To estimate thermal stability and write field requirements, the following may be assumed: a Co platelet having a diameter of 20 nm and a thickness of 0.4 nm sandwiched between Pt layers having thicknesses of 0.8 nm. Further, assume 0.2 nm polarized Pt due to proximity to Co. The total ferromagnetic thickness is $t^*_{FM}=0.8$ nm and the overall structure is 2 nm thick. The bottom and top surfaces of these platelets are nonmagnetic. The average moment density is 800 emu/cm$^3$ assuming equal weighting of Co (1400 emu/cm$^3$) and polarized Pt (~200 emu/cm$^3$) magnetizations. With $K_u \sim 2K_S/t^*_{FM}$ and $K_S \sim 1$ erg/cm$^2$, one obtains $K_u=2.5 \times 10^7$ erg/cm$^3$, hence $H_K=2K_u/M_S=62.5$ kOe, which is beyond the write field capability of conventional perpendicular heads. Reducing the anisotropy constant to $Ku \sim 1.0 \times 10^7$ erg/cm$^3$, which can be achieved through processing methods such as ion induced interface mixing, roughness, etc., the write field becomes $H_0 \sim K_u/M_S \sim 12{,}500$ Oe, which is roughly compatible with Tbit/in$^2$ perpendicular modeling predictions. The minimum stable platelet diameter is estimated to be Dp~33 nm based. At $D_p=33$ nm, one loses about 3× in cross track averaging, compared with conventional approaches. This loss is to be weighted against the 7× gain through thickness averaging. The estimated gain is $\Delta SNR=10 \times (\log(7/3)) \sim +4$ dB. There are tradeoffs between the number of platelets across the track (N) and through the thickness of the medium (P). Modeling may be used to evaluate and optimize the configuration of the platelet media.

An advantage of the present platelet media structure is that the seed layer 16 between the soft-underlayer 14 and the multilayer magnetic recording structure 20 can be extremely thin while obtaining a sufficiently flat surface. For example, a monolayer of smooth oxide on the surface of the soft underlayer 14 may be sufficient to provide an appropriate growth template. Accordingly, the thickness of the seed layer 16 could be very thin, i.e., of the order of one atomic layer.

Another advantage is the relatively high magnetization of 800 emu/cm$^3$ per switching volume, hence reduced write field requirement $K_u/M_S$. To achieve this, it is desirable to generate a non-magnetic interface between platelets in the vertical direction. For example, Pt might still cause some RKKY-type exchange coupling, since it is a highly polarizable material. Most of the Pt moment, however, is confined to the first atomic layer of Pt adjacent to the Co platelets, hence the outer Pt layer should be nonmagnetic. Alternatively, nano-oxide layers such as alumina may be deposited between composite layers in order to prevent any exchange from coupling adjacent platelets in the vertical direction. Exchange decoupling in the platelet planes should be very efficient and generally easier than in three-dimensional systems, owing to a smaller contact area in the relatively thin equiaxed platelet structures.

Whereas particular embodiments of this invention have been described above for purposes of illustration, it will be evident to those skilled in the art that numerous variations of the details of the present invention may be made without departing from the invention as defined in the appended claims.

The claimed invention is:

1. A magnetic recording medium comprising:
   a substrate; and
   a multilayer magnetic recording structure on the substrate comprising alternating layers of composite material and spacer material consisting essentially of a noble metal, wherein the composite material comprises an exchange decoupled discontinuous magnetic phase and a continuous nonmagnetic phase, and the discontinuous magnetic phase of each layer of composite material is randomly positioned with respect to the discontinuous magnetic phase of adjacent layers of the composite material and/or the discontinuous magnetic phase of each layer of composite material is non-vertically aligned with respect to the discontinuous magnetic phase of adjacent layers of the composite material.

2. The magnetic recording medium of claim 1, wherein the discontinuous magnetic phase comprises at least one metal selected from Co, Ni, Fe, FeCo, FeNi, FePt, CoNi and CoPt.

3. The magnetic recording medium of claim 1, wherein the discontinuous magnetic phase comprises Co.

4. The magnetic recording medium of claim 1, wherein the continuous nonmagnetic phase comprises C, SiO$_x$, ZrO$_x$, TiOx, AlO$_x$, SiN, ZrC, WC, TaC, TiC, Cu, Ag or Au.

5. The magnetic recording medium of claim 1, wherein the continuous nonmagnetic phase comprises C, AlO$_x$, Au or Ag.

6. The magnetic recording medium of claim 1, wherein the noble metal of the spacer layers comprises Pd, Pt and/or Au.

7. The magnetic recording medium of claim 1, wherein the noble metal of the spacer layers comprises Pt.

8. The magnetic recording medium of claim 1, wherein the multilayer magnetic recording structure comprises from 1 to 40 layers of each of the composite material and spacer material.

9. The magnetic recording medium of claim 1, wherein each composite layer has a thickness of from about 0.3 to about 0.5 nm, and each spacer layer has a thickness of from about 0.8 to about 3 nm.

10. The magnetic recording medium of claim 1, wherein the discontinuous magnetic phase comprises substantially equiaxed platelets.

11. The magnetic recording medium of claim 10, wherein the platelets have an average diameter of from about 5 to about 40 nm.

12. The magnetic recording medium of claim 1, wherein the discontinuous magnetic phase comprises from about 30 to about 80 volume percent of the composite material.

13. The magnetic recording medium of claim 1, further comprising a soft magnetic layer between the substrate and the multilayer magnetic recording structure.

14. The magnetic recording medium of claim 13, further comprising a seed layer between the soft magnetic layer and the multilayer magnetic recording structure.

15. A multilayer magnetic recording structure comprising alternating layers of composite material and spacer material consisting essentially of a noble metal, wherein the composite material comprises an exchange decoupled discontinuous magnetic phase and a continuous nonmagnetic phase, and the discontinuous magnetic phase of each layer of composite material is randomly positioned with respect to the discontinuous magnetic phase of adjacent layers of the composite material and/or the discontinuous magnetic phase of each layer of composite material is non-vertically aligned with respect to the discontinuous magnetic phase of adjacent layers of the composite material.

16. The multilayer magnetic recording structure of claim 15, wherein the discontinuous magnetic phase comprises at least one metal selected from Co, Ni, Fe, and NiFe, CoNi or CoFe.

17. The multilayer magnetic recording structure of claim 15, wherein the continuous nonmagnetic phase comprises C, $SiO_x$, $ZrO_x$, $TiOx$, $AlO_x$, SiN, ZrC, WC, TaC, TiC, Cu, Ag or Au.

18. The multilayer magnetic recording structure of claim 15, wherein the noble metal of the spacer layers comprises Pd, Pt, Au, PdAu, PtAu or PdPt.

19. The multilayer magnetic recording structure of claim 15, wherein the multilayer magnetic recording structure comprises from 1 to 40 layers of each of the composite material and spacer material.

20. The multilayer magnetic recording structure of claim 15, wherein the discontinuous magnetic phase comprises substantially equiaxed platelets.

21. A method of making a multilayer magnetic recording structure, the method comprising depositing alternating layers of composite material and spacer material consisting essentially of a noble metal, wherein the composite material comprises an exchange decoupled discontinuous magnetic phase and a continuous nonmagnetic phase, and the discontinuous magnetic phase of each layer of composite material is randomly positioned with respect to the discontinuous magnetic phase of adjacent layers of the composite material and/or the discontinuous magnetic phase of each layer of composite material is non-vertically aligned with respect to the discontinuous magnetic phase of adjacent layers of the composite material.

22. The method of claim 21, wherein the composite material is deposited by sputtering.

23. The method of claim 22, wherein the magnetic phase and nonmagnetic phases are provided from different sputtering targets.

24. The method of claim 22, wherein the magnetic phase and nonmagnetic phases are provided from a single sputtering target.

25. The method of claim 21, further comprising heat treating the composite material after is has been deposited.

26. The magnetic recording medium of claim 1, wherein the discontinuous magnetic phase has an easy axis of magnetization substantially perpendicular to a plane defined by the layers of composite material.

* * * * *

UNITED STATES PATENT AND TRADEMARK OFFICE
CERTIFICATE OF CORRECTION

PATENT NO. : 7,128,987 B2  Page 1 of 1
APPLICATION NO. : 10/337103
DATED : October 31, 2006
INVENTOR(S) : Rene Johannes Marinus van de Veerdonk et al.

It is certified that error appears in the above-identified patent and that said Letters Patent is hereby corrected as shown below:

Column 1, Line 47
"...1850 kfic x 540 ktpi..." should read --...1850 kfci x 540 ktpi...--

Column 4, Line 14
"...available de or rf..." should read --...available dc or rf...--

Column 4, Line 60
"ΔSNR'2" should read -- ΔSNR= --

Signed and Sealed this

Thirteenth Day of February, 2007

JON W. DUDAS
*Director of the United States Patent and Trademark Office*